C. WEEKS.
CONTAINER.
APPLICATION FILED MAR. 25, 1919.
1,386,917.
Patented Aug. 9, 1921.
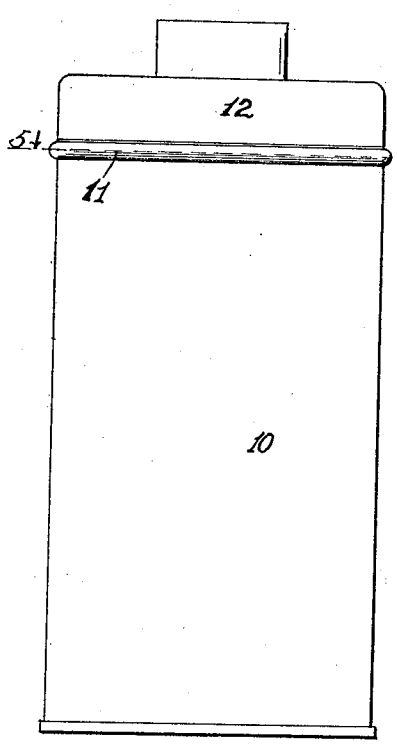
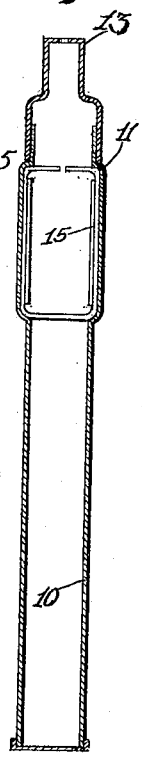
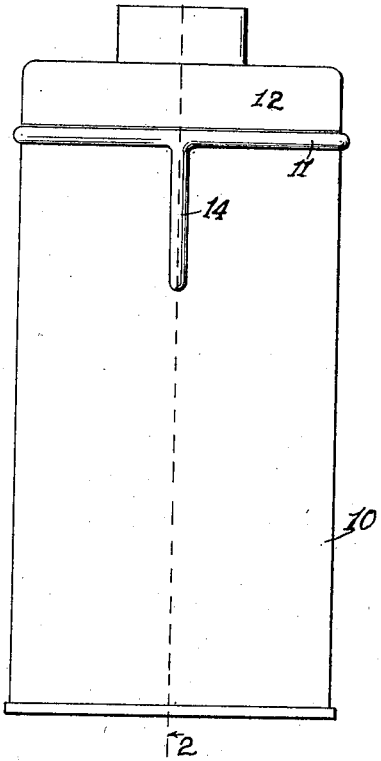
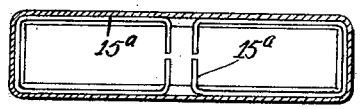
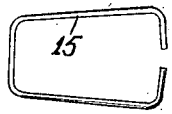
Witness.
Nevin A. Trissell.
Inventor
Carl Weeks
By Churg & Bair Attys.

UNITED STATES PATENT OFFICE.

CARL WEEKS, OF DES MOINES, IOWA.

CONTAINER.

1,386,917.   Specification of Letters Patent.   Patented Aug. 9, 1921.

Application filed March 25, 1919. Serial No. 285,014.

*To all whom it may concern:*

Be it known that I, CARL WEEKS, a citizen of the United States, and resident of Des Moines, in the county of Polk and State of Iowa, have invented a certain new and useful Container, of which the following is a specification.

The object of my invention is to provide a container of simple, durable and inexpensive construction.

More particularly it is my object to provide a comparatively thin container adapted to be carried in the pocket, or in a flat toilet case, and designed for containing talcum powder or the like, the container having a removable cap and having means for preventing the collapsing of the container adjacent to the cap.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a container embodying my invention.

Fig. 2 shows a transverse, vertical, sectional view taken on the line 2—2 of Fig. 1.

Fig. 3 shows a detail view of the brace device.

Fig. 4 shows a side elevation of a modified form of my container; and

Fig. 5 shows a horizontal, sectional view taken on the line 5—5 of Fig. 4.

In many instances it is desirable to have containers for toilet purposes, such as talcum powder and the like, made in the form of a thin, comparatively flat receptacle, adapted for convenient carriage in a flat toilet case or in the pocket.

Heretofore it has been difficult to make such a container which was satisfactory, for the reason that the container for convenience in filling should have a removable cap, and the thin container is frequently grasped by the fingers near its middle and near the cap, so that the container body is pressed away from the cap with the result that the powder or other contents of the container will leak out.

It is my object to provide a thin flat container which will not be subject to the above objections.

In the accompanying drawings I have shown the container comprising a receptacle body 10, which is relatively thin and flat and is considerably wider than it is thick, as illustrated in Figs. 1 and 2.

The container has near its upper portion the annular, outwardly extending channel-shaped rib 11, and has a portion extending upwardly above said rib.

Mounted on the upper portion is a cover cap 12 which may be provided with any suitable discharge device 13 for convenient use in shaking or otherwise removing the talcum powder or other contents of the container.

It is found in the use of a container of this kind, which is thin enough to be carried conveniently in the pocket or flat case for toilet articles, the user will frequently grasp the container near its upper part between the thumb and fingers and in shaking will press the side walls of the container toward each other, with the result that the side walls near their middle line are pressed away from the walls of the cover cap 12, thereby causing an opening between the upper portion of the side wall of the receptacle 10 and the walls of the cover cap 12.

This is an undesirable defect and for doing away with such defect I have provided the following means.

On each side of the receptacle 10 near the middle thereof I have provided an outwardly extending hollow rib 14, extending downwardly from the rib 11 and forming what is really an inwardly opening channel.

Received in the channel is a resilient member preferably substantially rectangular in form when installed in the device, and having the form of a broken rectangular ring, the end of the device, which is indicated by the numeral 15, being at the upper part of the container, as illustrated in Fig. 2.

The resilient brace device 15 is designed to have its side members fit in the channels formed by the ribs 14, as illustrated in Fig. 2. The brace device is originally made so that its free ends normally stand spaced substantially apart from each other.

These free ends are pressed together, however, when the brace device is inserted in the receptacle, and when installed stand quite closely adjacent to each other, as illustrated in Fig. 2 so that when the side walls of the can are pressed toward each other, the ends of the brace member 15 will engage each other and prevent said side walls from being pressed inwardly away from the walls of the cover cap 12.

The brace device 15 may be made of spring wire or other suitable material which will not materially interfere with the discharge of talcum powder or any other content of the receptacle.

The rib 14 not only forms on its inner part a channel for the brace device, but the outer portion thereof forms a means for firmly gripping the receptacle 10, and it is found that the user will ordinarily grip the receptacle by grasping the ribs 14 between the thumb and fingers, so that the pressure on the sides of the receptacle is always at a strong point.

In Figs. 4 and 5 I have shown a modified form of the device in which the receptacle 10 is provided with the rib 11 which forms an inwardly opening channel. The cover cap 12 is the same as in the preferred form of the device.

The ribs 14 are dispensed with and two of the resilient devices 15ª are placed in the channel formed by the rib 11 with their free ends adjacent to each other, as shown in Fig. 5.

In the form of device shown in Figs. 4 and 5 the resilient brace devices serve the same purpose as in the form of the device shown in Fig. 1.

My container can be made economically and has numerous advantages, some of which have already been referred to.

Changes may be made in the construction and arrangement of the parts of my invention, and it is my intention to cover by my claims any modified forms of structure or use of mechanical equivalents which may be reasonably included within the scope of my claims.

I claim—

1. In a device of the class described, a thin, flat receptacle, having formed in its sides, near its upper end, a pair of rib members forming inwardly opening channel portions, a resilient brace device having the form of a broken ring of suitable outline, received in said channel portions with its free ends normally spaced from each other and adapted when moved together to brace and limit the amount of inward movement of the sides of the receptacle, as and for the purposes stated.

2. In a device of the class described, a thin, flat receptacle, having formed in its sides, near its upper end a pair of vertical rib members, whereby a channel portion is formed on the inner surfaces of its sides, a brace device comprising a wire of rectangular outline, two of the sides of said rectangular outline being received in the channel portions formed by the pair of ribs, whereby the sides of the receptacle will be reinforced against inward pressure applied on the outside of the receptacle.

Des Moines, Iowa, January 24, 1919.

CARL WEEKS.